United States Patent [19]

Freeburg

[11] Patent Number: 5,095,535
[45] Date of Patent: Mar. 10, 1992

[54] HIGH BIT RATE COMMUNICATION SYSTEM FOR OVERCOMING MULTIPATH

[75] Inventor: Thomas A. Freeburg, Arlington Heights, Ill.

[73] Assignee: Motorola, Inc., Schaumburg, Ill.

[21] Appl. No.: 225,503

[22] Filed: Jul. 28, 1988

[51] Int. Cl.⁵ .............................................. H04B 7/04
[52] U.S. Cl. .................................. 455/278; 455/277; 455/65
[58] Field of Search ............... 455/272, 278, 277, 283, 455/295, 134, 135, 67, 226, 65; 342/421

[56] References Cited

U.S. PATENT DOCUMENTS

| | | | |
|---|---|---|---|
| 3,383,599 | 5/1968 | Miyagi | 325/305 |
| 4,057,758 | 11/1977 | Hattori et al. | 325/56 |
| 4,090,197 | 5/1978 | Cantrell | 343/16 M |
| 4,101,836 | 7/1978 | Craig et al. | 455/277 |
| 4,119,969 | 10/1978 | Barton | 434/108 M |
| 4,223,312 | 9/1980 | Gammel | 342/426 |
| 4,270,207 | 5/1981 | Gutleber | 375/40 |
| 4,293,955 | 10/1981 | Gehr et al. | 455/276 |
| 4,326,294 | 4/1982 | Okamoto et al. | 455/139 |
| 4,473,828 | 9/1984 | Morz et al. | 343/786 |
| 4,499,606 | 2/1985 | Rambo | 455/277 |
| 4,525,869 | 6/1985 | Hamada et al. | 455/278 |
| 4,549,311 | 10/1985 | McLaughlin | 455/277 |
| 4,549,312 | 10/1985 | Michaels et al. | 455/311 |
| 4,566,133 | 1/1986 | Rambo | 455/277 |
| 4,611,212 | 9/1986 | Lee | 343/351 |
| 4,696,053 | 9/1987 | Mastriani et al. | 455/67 |
| 4,721,960 | 1/1988 | Lait | 342/368 |
| 4,726,073 | 2/1988 | Sessink | 455/205 |

OTHER PUBLICATIONS

"FM Multipath Distortion in Automobile Receivers has been Significantly Reduced by a New Antenna System", by S. Takeda et al., 1980/IEEE, pp. 263-269.
"Introduction to Spread-Spectrum Antimultipath Techniques and Their Application Urban Digital Radio", by George L. Turin, 1980 IEEE, pp. 328-353.
"FM Receivers in Automobiles, A Case for Diversity Reception", by Robert A. Finger and Emil L. Torick, 1981/IEEE, pp. 51-85.
"Diversity Techniques for Mobile Radio Reception", by J. D. Parsons, Miguel Henze, P. A. Ratliff, and Michael J. Withers, Aug., 1984 IEEE, pp. 75-85.

*Primary Examiner*—Reinhard J. Eisenzopf
*Assistant Examiner*—Edward Urban

[57] ABSTRACT

A communication system for relatively high data bit rate RF communication overcomes multipath interference by employing relatively narrow beam antenna sectors and by selecting the best communication path established between two terminals, at least one of which has narrow beam antenna sectors. The communication path selection process includes determining the signal integrity of data communicated between the terminals. One implementation includes the narrow beam antenna sectors at each terminal.

20 Claims, 5 Drawing Sheets

FIG. 3
RADIO TELEPHONE UNIT

HIGH BIT RATE COMMUNICATION SYSTEM FOR OVERCOMING MULTIPATH

FIELD OF THE INVENTION

The present invention relates generally to high data rate/radio-frequency (RF) communication systems, and, more particularly, to overcoming multipath interference in cellular RF communication systems transmitting data at high data bit rates.

DESCRIPTION OF THE PRIOR ART

In cellular-type radiotelephone RF communications systems using angle modulation (frequency modulation or phase modulation) to transmit data at high data rates, communication is severely impaired as a result of multipath interference. Multipath interference results in such systems when two or more signals are received offset in time. This often occurs in an environment having signal deflecting structures. Each signal deflection delays the arrival of the transmitted signal. These deflections can generate signals having differential path delays exceeding a substantial fraction of the data symbol duration, e.g., where the differential path delay is more than half of the data symbol width, thereby creating overlapping signals that impair or destroy signal intelligibility at the receiver.

Traditionally, radio communications systems have avoided this problem by transmitting data at relatively low bit rates by making the data symbol duration much longer. Hence, the data symbol duration is much longer than the differential path delays of the deflected signals, and the resultant interference is negligible. Unfortunately, low bit rate communication is becoming unacceptable as system designers attempt to meet the demands for a high capacity cellular radio system which can efficiently accommodate digitized voice as well as data communication.

More recent attempts to overcome multipath interference in high bit rate communication systems can be categorized into two groups. The first group involves time domain equalizers. Systems employ time domain equalizers to identify the differential path delays so that they may be subtracted out by the receiver. Commonly, a tapped delay line is employed to provide various delayed output signals which may be analyzed to identify the time delayed signal paths. The output signals of the tapped delay line are then selectively summed so that the identified time delayed signal paths add to produce a composite signal representative of the original non-deflected signal. This scheme can also be implemented with a digital signal processor (DSP).

The second group is sometimes referred to as the spread spectrum approach. This approach includes multiplying each transmitted signal with a psuedo-random (noise-like) signal at a relatively high frequency. Due to the delay differences of the deflected signals, the delayed signals are uncorrelated at the receiver. The receiver employs a circuit to phase lock to a signal generated with the psuedo-random (PSR) signal. The receiver then divides out this PSR signal in phase with the original so that only one signal is received with the PSR signal cancelled out. The remaining out-of-phase signals become weaker because the originally introduced PSR signal is out of phase with the delayed PSR signals (via the reflections), and, therefore, rejected.

Both the spread spectrum approach and the time domain equalizer approach, however, have the disadvantage in that they require substantial circuitry. The spread spectrum approach requires not only a random sequence generator, but phase locking circuitry at each receiver to phase lock the PSR signal generated at the transmitting and receiving points of communication. The time domain equalizer requires delay line circuitry or its equivalent with substantial processing intelligence to effectively produce a representative composite signal. Such circuitry significantly adds to the receiver's expense, and to its material cost and size.

For these reasons, a communication system is needed which overcomes the foregoing deficiencies.

OBJECTS OF THE INVENTION

It is a general object of the present invention to provide a communication system which overcomes the above-mentioned shortcomings.

It is a more particular object of the present invention to provide a high data rate cellular radiotelephone communication system which employs antenna selection at the receiving terminal to overcome multipath interference.

It is another object of the present invention to provide a high data rate cellular radiotelephone communication system which employs antenna selection at both receiving and transmitting terminals to overcome multipath interference.

BRIEF DESCRIPTION OF THE DRAWINGS

The features of the present invention which are believed to be novel are set forth with particularity in the appended claims. The invention, together with further objects and advantages thereof, may best be understood by making reference to the following description taken together with the accompanying drawings, in which reference numerals identify the elements, and wherein:

DETAILED DESCRIPTION OF THE PREFERRED EMBODIMENT

The arrangement disclosed in this specification is directed to high data rate transmission on a radio frequency (RF) communication channel in a cellular radiotelephone communication system. More particularly, the arrangement disclosed herein is directed to employing such communication in a multipath environment, e.g., cellular radio communication within a building.

Figures 1A, 1B:
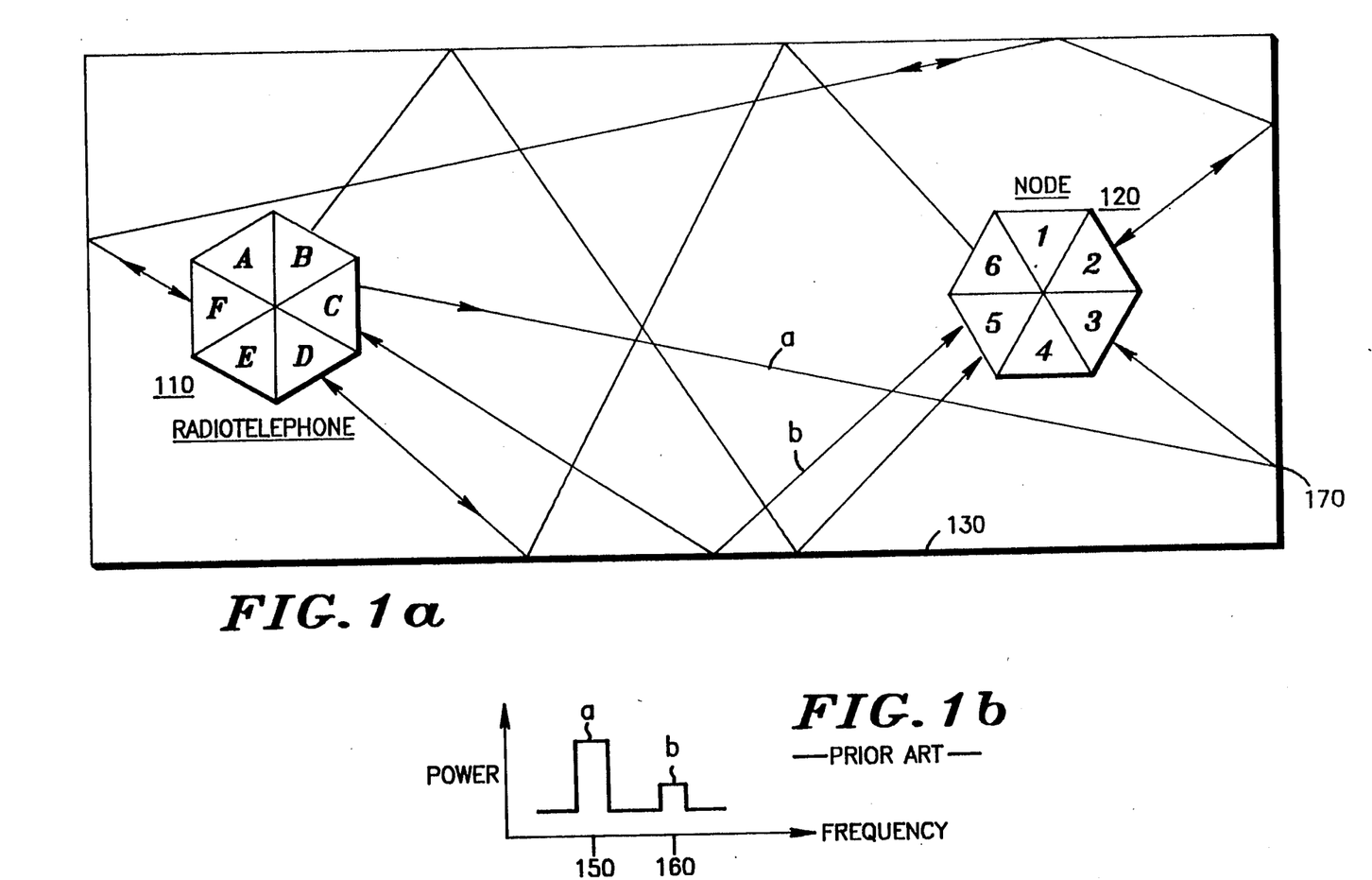
FIG. 1a is a diagram illustrating the multipath problem for high data rate communication between two communication terminals, depicted in accordance with the present invention.
FIG. 1b is a known amplitude/time graph illustrating the multipath problem for high data rate communication between two communicating terminals, in which two communication paths from FIG. 1a are employed to illustrate the problem.

FIGS. 1a and 1b illustrate such a cellular system in a multipath environment. Two terminals are shown in FIG. 1a, a radiotelephone 110 and base site equipment (node) 120 (hereinafter the terms "node" and "base site equipment" will be used interchangably). Communication between the radiotelephone 110 and the node 120 is accomplished by employing directional antennas (illustrated and discussed with FIGS. 2 and 3). Both the radiotelephone 110 and the node 120 include the directional antennas to form 6 sectors, depicted A-F and 1-6, respectively, for such communication.

Multipath interference can result when a signal that is transmitted at one terminal is received at the other terminal at two different times. For example, consider a signal (along path "b") transmitted from the directional antenna at sector C of the radiotelephone 110, deflected off a structure 130 and received at the directional antenna at sector 5 of the node 120, while the same transmitted signal (along path "a") is received at the directional antenna at sector 5 without any such deflections.

In FIG. 1b, a time/power graph illustrates the effect the deflection along path "b" has on the received signal. This illustration depicts the first bit received at sector 5 of the node 120. At time 150, the amplitude of the first bit via path "a" is normal and as expected in typical point to point transmission. At time 160, the the first bit via path "b" arrives during the time which is allocated for a succeeding bit, causing severe degradation of that bit. This is caused by the subsequent bit of the transmitted signal arriving via path "a" at the same time as the first bit arriving via path "b". Consequently, the multipathed signals interfere, and both the signal amplitude and the signal integrity deteriorate. With regards to data communication, "signal integrity" means data bit accuracy.

A preferred embodiment, according to the present invention, employs multiple sectors provided by the multiple directional antennas at the receiving terminal to overcome the multipath interference. It should be noted that a single electrically or mechanical steerable antenna is the equivalent of the multiple directional antennas and can be substituted therefor. The terminal receiving the multipath signal evaluates the signal at each of the multiple sectors, and selects to use the data that is received via the path which has the least amount of signal degradation caused by the multipath interference. This selected path is then used for subsequent transmission of the data between both terminals in a duplex operation.

For example, consider once again the transmission from sector C of the radiotelephone 110 to sector 5 of the node 120. As previously discussed, the signal received at sector 5 is severely degraded and most likely unintelligible. However, because this signal, via path "a", also deflects off a structure 170, it is received at sector 3 of node 120. At node 120, there are now two sectors from which to receive and interpret the transmitted signal. According to the present invention, the signal quality, i.e., both the signal strength and signal integrity, is measured to determine the better reception path.

In another preferred embodiment, according to the present invention, all six sectors created at both terminals are employed to overcome this multipath problem. Such an implementation provides 36 transmission paths from which to choose to overcome the multipath problem. Essentially, the 36 paths result from providing six sectors from which a signal is transmitted and six sectors at which the signal is received. Although any number of sectors may be chosen at either terminal, the six sectors that are shown provide adequate selection means for overcoming multipath in a typical business office environment.

Figure 2:
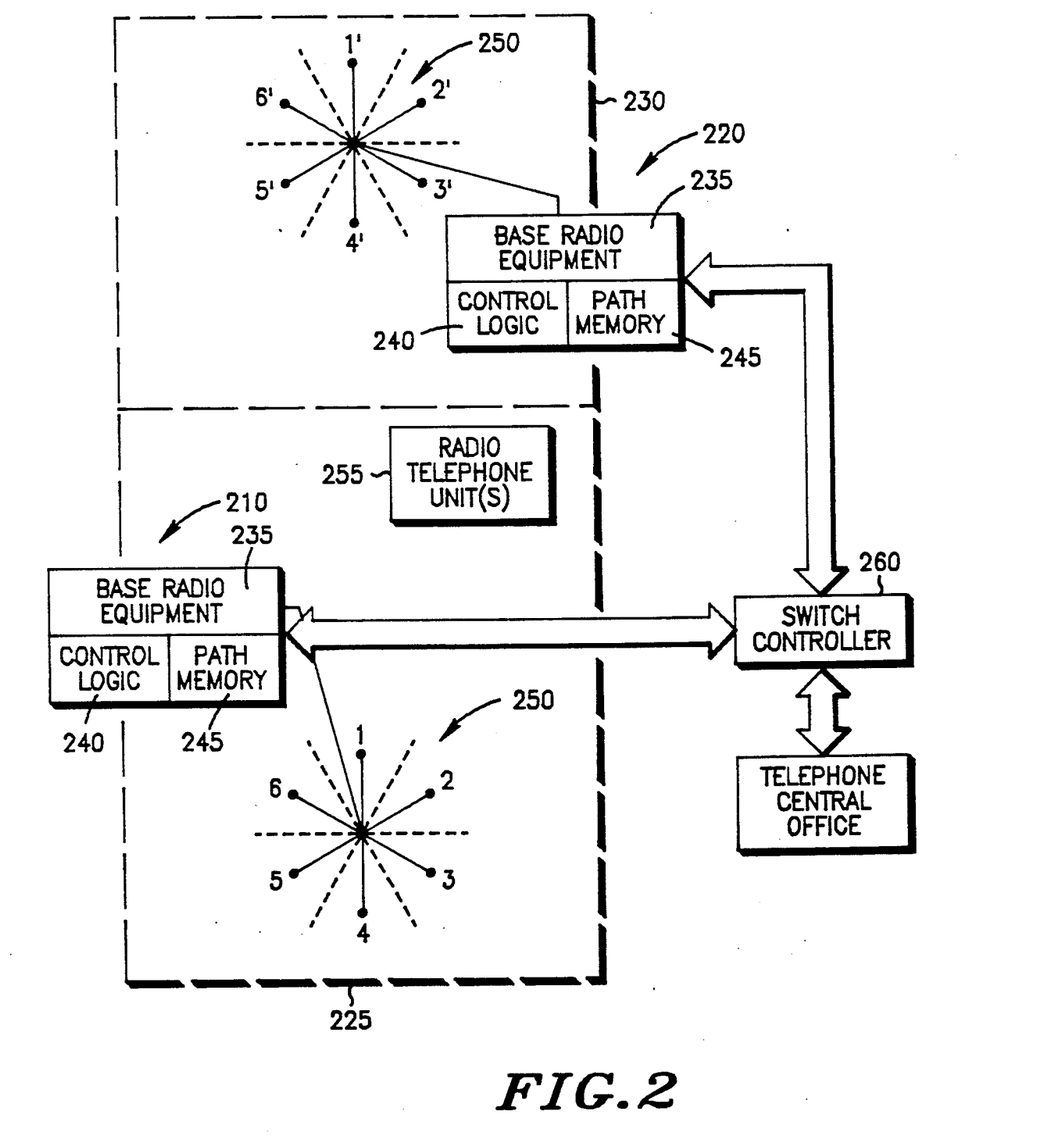
FIG. 2 is a diagram of a cellular communication system including a radiotelephone and two base sites (nodes) with their respective equipment, according to the present invention.

In FIG. 2, a system, as described above, is shown to include base site equipment 210 and 220 for two geographic radio frequency (RF) coverage areas (cells) 225 and 230, respectively. Due to the indoor/office application to which this system is directed, the borders of cells 225 and 230 are irregularly shaped. Typically, the borders are defined not only by the communication power provided within each cell, but also by the office structures. Also, because of the many reflecting surfaces, the "sectors" formed by the directional antennas have little or no relationship with the actual physical coverage. Rather, the directional antennas are primarily used to control multipath as described above.

The base site equipment 210 or 220 includes base radio equipment 235 for transmitting and receiving data, control logic 240 for controlling the radio equipment 235, and path memory 245 for storing and accessing selected communication paths for active radiotelephone calls. Additionally, the base site equipment 210 or 220 includes a directional antenna 250 for providing the 6 previously discussed sectors (1-6) for radiotelephone communication. For purposes of exemplifying such radiotelephone communication, a radiotelephone unit 255 is illustrated in communication with the base site equipment 210 within cell 225.

The base radio equipment 235 at each site may be implemented using conventional base site equipment. The control logic 240 may be implemented using conventional base site controller processing equipment.

It should be pointed out that such equipment can be modified, consistent with the present invention, to accommodate time-division-multiple-access (TDMA) communication. For example, an adequate TDMA implementation is described in "Primer for the Future ... DIGITAL TECHNOLOGY", L.M. Ericsson Telephone Co., June 1987, incorporated herein by reference.

The path memory 245 can be implemented using any conventional volatile or nonvolatile memory device.

For further details of base site equipment, reference may be made to U.S. Pat. Nos. 4,549,311 McLaughlin, 4,485,486 Webb et al. and 4,696,027 Bonta, each assigned to the same assignee and incorporated herein by reference.

Overall control of the base site equipment 210 or 220 is provided by a cellular switch controller 260. The switch controller 260 also includes a digital switching network (not shown) for controlling the call switching operation between a public telephone central office 265 and the base site equipment 210 and 220. For general details of a conventional cellular system, reference may be made to "Cellular Voice and Data Radiotelephone System", Labedz et. al., U.S. Pat. No. 4,654,867. For further details of a conventional cellular switch controller, reference may be made to U.S. Pat. No. 4,268,722, Little et al. Both of the above U.S. patents are assigned to the same assignee and incorporated herein by reference.

Figure 3:
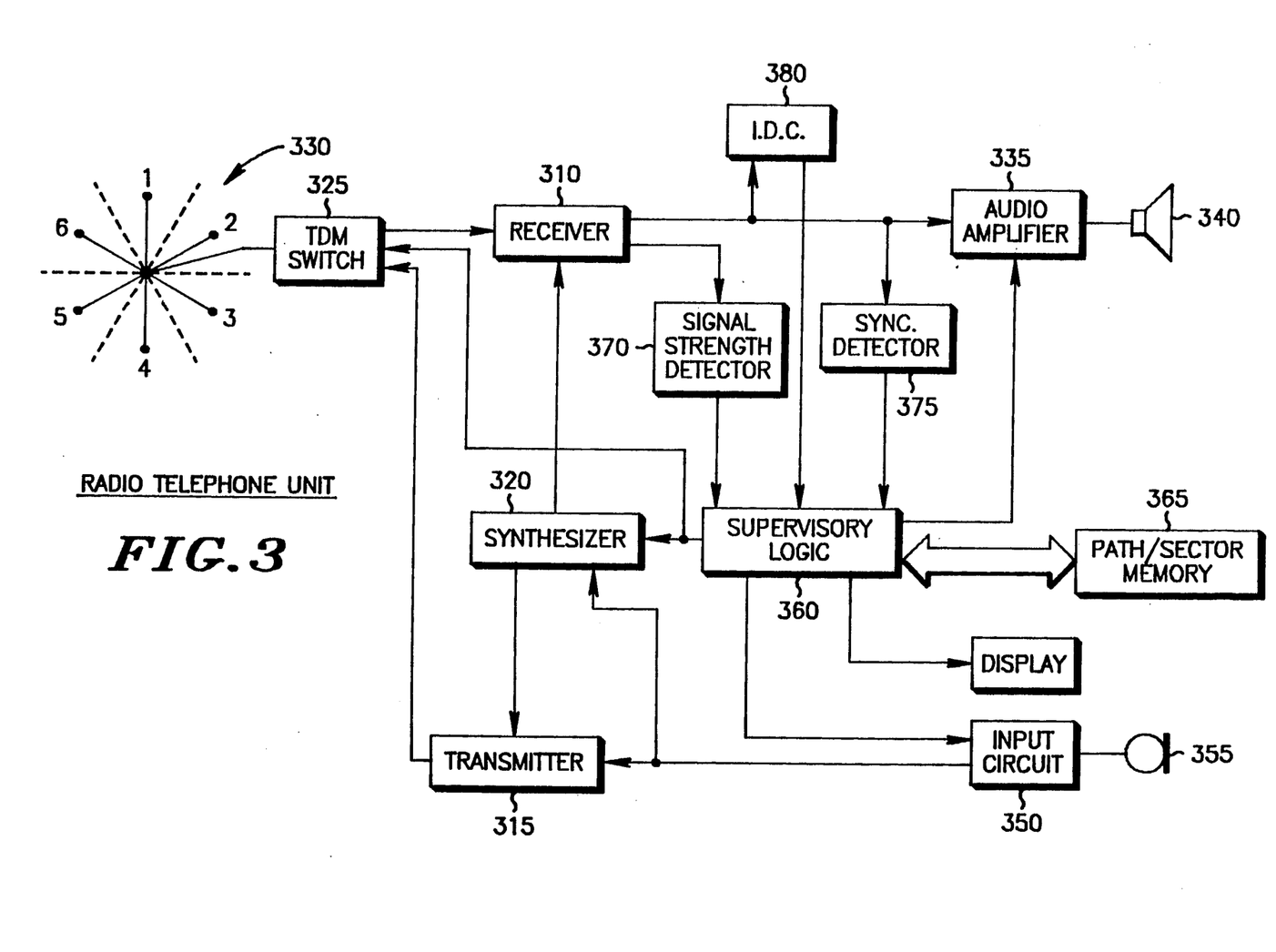
FIG. 3 is an expanded diagram of the radiotelephone unit 255, according to the present invention.

In FIG. 3, an expanded block diagram of the radiotelephone unit 255 of FIG. 2 is shown to include conventional RF components: a receiver 310, a synthesizer 320, a transmitter 315 and an RF switch 325. The switch 325 is used to switch a sectorized antenna 330 between the receiving mode and the transmitting mode, for the receiver 310 and the transmitter 315, respectively.

The receiver 310, synthesizer 320 and transmitter 315 may be implemented using those circuits illustrated and described in "DYNATAC Cellular Mobile Telephone Instruction Manual", Motorola Publication No. 68P81070E40, available from Motorola C & E Parts, 1313 E. Algonquin Road, Schaumburg, Ill., 60196, incorporated herein by reference.

The switch 325 may be implemented using conventional PIN diodes or other well-known technology.

The sectorized antennas 330 and 250 may be implemented using for instance, horn antenna techniques as described in Chapter 15 of "Antenna Engineering Handbook", by Johnson and Jasik, McGraw-Hill, 1961; (Library of Congress No. TK7872A6A6).

Other conventional components include an audio amplifier 335 for broadcasting received information through a speaker 340, a display 345 for indicating the status of the radiotelephone unit 225, and an input circuit 350 and a speaker 355 for receiving and providing audible information from and to the radiotelephone user.

Overall control of the radiotelephone unit 225 is provided by supervisory logic 360. Functions provided by supervisory logic 360 include timing for the switch 325, muting the amplifier 335, and controlling the display 345 and input circuit 350. Additionally, the supervisory logic 360 analyses received data via the receiver 310 and stores and accesses sector path information in a path/sector memory circuit 365.

The path/sector memory circuit 365 is used to set up a table for determining and maintaining the communication quality of the data paths between a sector from the antenna at the base site equipment (node) 210 or 220 and the radiotelephone 255.

Before the structure of the table is discussed, some background of the system communication process is needed. As previously discussed, in a preferred embodiment according to the present invention, all six sectors created at both terminals are employed to overcome the multipath problem. Such an implementation provides 36 transmission paths from which to choose the best communication path. At the node, a special TDMA data transmission, referred to as a "sounding pulse", is transmitted via each sector (1-6) in sequence. At the radiotelephone unit, the six "sounding pulse" data transmissions are received on one sector (A-F). After receiving this TDMA data transmission, repeated six times, on the one sector, e.g., sector A, the radiotelephone unit receives the next TDMA data transmission, repeated six times, on the next sector, e.g., sector B. This communication process continues throughout system operation.

The table stored in the path/sector memory circuit 365 is used to prioritize the communication paths. For example, after receiving and analyzing data on sector A of the antenna 330, the supervisory logic unit identifies that the data was transmitted from the node's 5th antenna sector. A quality measurement is made for the communication made therebetween and such measurement is stored for the path 5-A. A similar measurement and record is made after each TDMA transmission is received. After each quality measurement is made for the corresponding communication path (node antenna sector to radiotelephone antenna sector), the measurement is compared to measurements made for other communication paths between the node and radiotelephone unit. Based upon such comparisons, each measurement is ranked. At any given time the table may include the following node-radiotelephone path data entries:

| Path | Quality | Rank |
| --- | --- | --- |
| 5-A | 26 | 3 |
| 2-B | 27 | 2 |
| 6-A | 14 | 15 |
| . | . | . |
| . | . | . |
| 1-E | 39 | 1 |
| 1-C | 12 | 23 | where the highest quality is 50, the lowest quality is 1; and the highest rank is 1, the lowest rank is 36.

The system accommodates such analysis and measuring by providing TDMA frame data transmission. Each frame that is transmitted from an antenna sector includes header information leading the data, packet information including data for particular calls and trailer information at the end of each frame. The header information preferably includes synchronization bits for synchronizing the data communication, and identification information for identifying the terminal and its sector transmitting the frame. Using this information, the receiving radiotelephone unit can readily determine the antenna sector which was used to transmit the frame for table storage in the path/sector memory circuit 365.

The quality measurements made for the table are used to establish the rank recorded in the table; the better the quality, the higher the rank. Measuring the quality, as previously discussed, involves determining both the signal strength and the signal integrity. Both the signal strength and the signal integrity are preferably measured only with the header information in each frame. Not only does this minimize processing overhead of the supervisory logic 360 of each radiotelephone unit, it minimizes coding requirements relating to the packet information within each frame.

To measure the signal strength, the radiotelephone unit 225 employs a conventional signal strength detector 370 at the output of the receiver 310. The signal strength detector 370 provides a direct indication of the received signal strength to the supervisory logic 360. A signal strength detector such as that described in "DYNATAC Cellular Mobile Telephone Instruction Manual", supra, is adequate for this purpose.

To synchronize the supervisory logic to the received frame, the radiotelephone unit 225 employs a conventional synchronization detector 375. The synchronization detector is programmed with a synchronization pattern so that once the pattern is detected, the supervisory logic may be alerted. Such a detector can be implemented using a conventional serial comparator circuit which compares the incoming header information with the programmed synchronization pattern.

To measure the signal integrity, the radiotelephone unit 225 employs an interference detection circuit (IDC) 380 to indicate the level of bit (multipath) interference present on the node-radiotelephone communication path. The IDC 380 is preferably implemented using a bit error rate (BER) detector. For example, a digital demodulator circuit commonly used for detection may be modified to estimate the BER by conventionally determining the detector eye opening during the programmed synchronization pattern. In any case, the interference detection circuit 380 provides an indication of the signal integrity and the amount of multipath interference to the supervisory logic 360.

Accordingly, the supervisory logic 360 employs the signal strength detector 370 and the IDC 380 to measure the signal quality of the transmitted frame, while the synchronization detector 375 provides synchronization to the communication. Once the signal quality has been measured, it is stored, in table form, in the path/sector memory 365 and ranked with respect to the other 35 transmission paths. Such measuring recording and ranking continues so long as information is received by the radiotelephone unit.

With 36 possible communication paths between the radiotelephone unit and the node, the radiotelephone unit, employing the table in the path/sector memory 365, chooses one on which to rely for actual data communication. For example, if the node-radiotelephone path 1-E is the highest quality communication path, the radiotelephone unit outputs information received on path 1-E to the radiotelephone user, and transmits information to the node on the antenna sector that corresponds to path 1-E, i.e., antenna sector E.

Preferably, such measuring analysis is only performed at each radiotelephone unit. Although one skilled in the art could readily implement the circuitry shown in FIG. 3 in the base site equipment 210 or 220 of FIG. 2, by limiting such measuring and recording only to the radiotelephone unit substantial processing and circuitry overhead is avoided at the base site equipment. For this reason, not only does the radiotelephone unit select the path on which it will rely for data communication, the radiotelephone unit selects the path on which the node will rely for data received from the radiotelephone unit. For example, if the radiotelephone unit determines that path 1-E is the proper communication path for overcoming multipath interference, the radiotelephone unit relies on path 1-E for its transmitted and received data (as previously discussed), and also informs the node as to the antenna sector that should receive the data transmitted from the radiotelephone unit. If path 1-E is the proper communication path, antenna sector 1 is used by the node to receive the data transmitted from the radiotelephone unit.

Figure 4:
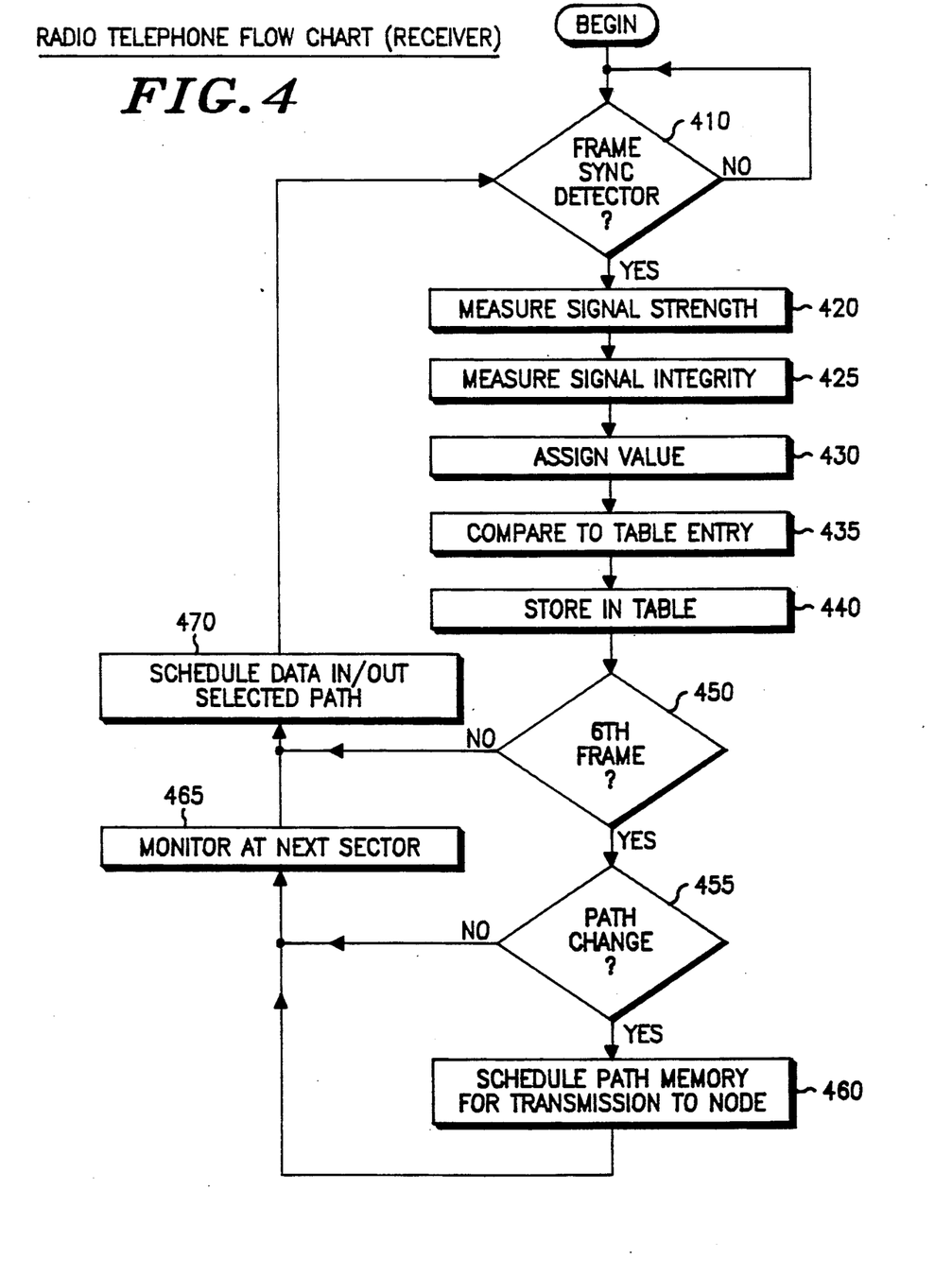
FIG. 4 is a flow chart depicting the communication process for the radiotelephone 225 of FIG. 2, according to the present invention.

In FIG. 4, a flow chart illustrates the communication process for the radiotelephone unit 225 of FIG. 3, with regards to the receive process. The flow chart begins at block 410 where a test is perform to determine if the frame synchronization pattern has been detected. If the frame synchronization pattern has not been detected, frame synchronization monitoring continues. If frame synchronization has been detected, flow proceeds from block 410 to block 420 where the signal strength of the data in the header is measured. At block 425 the signal integrity is measured. At block 430, based on both the measured signal strength and the measured signal integerity, a quality value is assigned to the communication path which provided the received frame.

At block 435, the assigned value (from block 430) is compared to the quality values recorded for the other communication paths in the table. Therefrom, the communication path is ranked to indicate the appropriateness of that communication path with respect to the other 35 communication paths. At block 440, the ranking and the quality measurement is stored in the path sector memory table for the corresponding communication path.

At block 450, a test is performed to determine if six frames have been analyzed, measured and ranked. As previously discussed, the radiotelephone unit receives six frames on each antenna sector (A-F) before receiving six frames on the next antenna sector, where such six frames represent the same basic data transmission but from the different node antenna sectors (1-6). If the sixth frame has not been received, flow proceeds to block 470 where the received TDM data is provided to the radiotelephone user and/or an appropriate response is scheduled for transmission from the radiotelephone unit to the node.

From block 450, flow proceeds to block 455 where a test is performed to determine if the most recent communication path ranking requires a change in the selected ("best") communication path. It should be noted that a path change (at block 455) should not occur each time a new communication path reaches the highest ranking level. Rather, to avoid instantaneous changes in communication path quality, a communication path is preferably changed only after it maintains the highest level ranking for a predetermined period of time, or after a number of received frames. Selection of this time period should be established on a system by system basis in order to accommodate the surrounding multipath environment.

If a communication path change is necessary, flow proceeds from block 455 to block 460 where the radiotelephone unit schedules the path change message for TDM transmission to the node so that the node can record which antenna sector to receive information from the radiotelephone unit.

From block 460 flow proceeds to block 465.

If a communication path change is not necessary, flow proceeds from block 455 to block 465 where the radiotelephone unit begins to monitor and receive frames from the next antenna sector.

From block 465 flow proceeds to block 470. At block 470, the selected "best" communication path is relied upon for transferring data to the telephone user and transmitting data to the node, as previously discussed.

From block 470 flow returns to block 410 where the radiotelephone unit continues to monitor and receive frames transmitted from the node.

Figure 5:
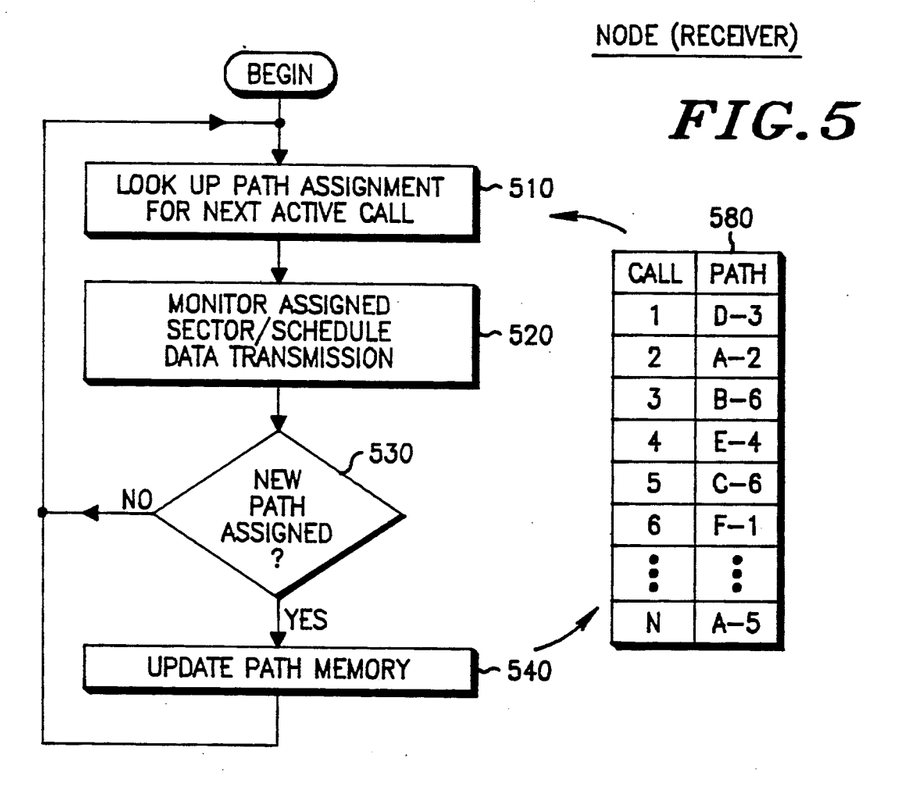
FIG. 5 is a flow chart depicting the communication process for the base site equipment 115 or 119 of FIG. 2, according to the present invention.

Referring now to FIG. 5, a flow chart illustrates the communication process for the base site equipment (node) 210 or 220, with regards to the receive process. The flow chart begins at block 510 where the control logic within the base site equipment accesses path memory to determine the antenna sector on which it should receive data from a radiotelephone unit in an active call. At block 520, the base site equipment monitors the assigned sector for radiotelephone TDM transmissions, and, as required, schedules data transmissions from the base site equipment to the radiotelephone.

At block 530 a test is performed to determine if a new communication path has been assigned by the radiotelephone unit. If a new path has not been assigned, flow returns to block 510 where communication continues for the next radiotelephone call.

If a new path has been assigned by the radiotelephone unit during the last communication, flow proceeds from block 530 to block 540 where the base site equipment's path memory is updated to record the appropriate path (antenna sector) on which to receive information from a radiotelephone unit in an active call.

A call/path table 580 is illustrated in FIG. 5 to exemplify the correspondence between each active call and the path assigned thereto by the radiotelephone unit in the active call. In the table 580, there are illustrated N active calls. The first active call is depicted having the "best" communication path D-3. The second active call is depicted as having the "best" communication path A-2, etc. In block 510, the base site equipment accesses the table 580 to determine the antenna sector that should be used to receive data for each particular radiotelephone call.

It will be understood by those skilled in the art that various modifications and changes may be made to the present invention without departing from the spirit and scope thereof.

What is claimed is:

1. For use in a RF communication system having a first terminal and a second terminal for communicating data therebetween, such communication being subject to substantial multipath interference caused by the reception of multiple signals having differential path delays exceeding a substantial fraction of the data symbol duration, at least a first terminal, comprising:
   a plurality of directional antennas for providing relatively narrow beam antenna sectors;
   receiver means, coupled to said plurality of directional antennas, for receiving RF signals via each of said plurality of directional antennas; and
   selection means, coupled to said receiver means, for selecting a communication path between the second terminal and one of said plurality of directional antennas, based at least partly on received RF signal integrity, so as to overcome reception errors caused by multipath interference.

2. The terminal of claim 1, wherein the receiver means includes a time division multiplex switch for switching the receiver means to alternately couple to the plurality of directional antennas.

3. The terminal of claim 1, wherein the selection means includes an interference detection circuit for indicating an amount of multipath interference in each communication path.

4. The terminal of claim 1, wherein the selection means includes memory means for storing information corresponding to received RF signal integrity, in order to prioritize the communication paths between the second terminal and the plurality of directional antennas, thereby identifying a best communication path.

5. A communication system for RF communication, such communication being subject to substantial multipath interference, comprising:
   a first terminal including:
      an antenna, and
      transmitter means, coupled to said antenna, for transmitting an RF signal containing first terminal sector identifying information; and
   a second terminal including:
      a plurality of directional antennas for providing relatively narrow beam antenna sectors,
      receiver means, coupled to said plurality of directional antennas, for receiving digital RF signals via each of said plurality of directional antennas, and
      selection means, coupled to said receiver means, for selecting from among various antenna combinations, a communication path between the antenna of the first terminal and a second terminal sector, based at least partly on received RF signal integrity, so as to overcome reception errors caused by multipath interference.

6. A communication system, according to claim 5, wherein the second terminal includes means for determining the signal strength of the transmitted RF signal.

7. A communication system according to claim 5, wherein the second terminal includes means for determining an amount of multipath interference in each communication path.

8. A communication system according to claim 5, wherein RF signal integrity is determined as a function of at least the RF signal's signal strength and the amount of multipath interference in the received RF signal's communication path.

9. A communication system according to claim 5, wherein the selection means includes memory means for storing information corresponding to received RF signal integrity, in order to prioritize the communication paths between the antenna of the first terminal and a second terminal sector, thereby identifying a best communication path.

10. A communication system for RF communication, such communication being subject to substantial multipath interference, comprising:
    a first terminal including:
       a plurality of first terminal directional antennas for providing relatively narrow beam antenna sectors, and
       transmitter means, coupled to said plurality of first terminal directional antennas, for transmitting, from a plurality of said first terminal directional antennas, an RF signal containing first terminal sector identifying information; and
    a second terminal including:
       a plurality of second terminal directional antennas for providing relatively narrow beam antenna sectors,
       receiver means, coupled to said plurality of second terminal directional antennas, for receiving RF signals via each of said plurality of second terminal directional antennas, and
       selection means, coupled to said receiver means, for selecting, from among various antenna combinations, a communication path between a first terminal sector and a second terminal sector, based at least partly on the received RF signal's integrity, so as to overcome reception errors caused by multipath interference.

11. A communication system for RF communication, according to claim 10, wherein the selected communication path is a duplex communication path.

12. A communication system for RF communication, according to claim 10, wherein the selection means includes means for determining the strength of at least one of said received RF signals.

13. A communication system for RF communication according to claim 10, wherein the selection means includes means for determining interference to at least one of said received RF signals.

14. A communication system for RF communication, according to claim 10, wherein the selection means includes means for determining interference to at least one of said received RF signals from at least one of multipath interference and a signal from an undesired signal source.

15. A communication system for RF communication, according to claim 10, wherein the received RF signal's integrity is a function of the received RF signal's signal strength and the amount of interference in the received RF signal's communication path.

16. A communication system for relatively high data bit rate RF communication, such communication being subject to substantial multipath interference, comprising:
- a first terminal including:
  - a plurality of first terminal directional antennas for providing relatively narrow beam antenna sectors, and
  - receiver means, coupled to said plurality of first terminal directional antennas, for receiving a first terminal designated digital RF signal via at least one of said plurality of first terminal directional antennas,
  - transmitter means, coupled to said plurality of first terminal directional antennas, for transmitting, at a plurality of said first terminal directional antennas, a second terminal designated digital RF signal containing first terminal sector identifying information; and
- a second terminal including:
  - a plurality of second terminal directional antennas for providing relatively narrow beam antenna sectors,
  - receiver means, coupled to said plurality of second terminal directional antennas, for receiving said second terminal designated digital RF signals via at least one of said plurality of second terminal directional antennas,
  - transmitter means, coupled to said plurality of second terminal directional antennas, for transmitting a digital RF signal from said plurality of second terminal directional antennas,
  - selection means, coupled to said receiver means, for selecting, from among various antenna combinations, a communication path between a first terminal sector and a second terminal sector, based at least partly on the received RF signal's integrity, so as to overcome reception errors caused by multipath interference, and
  - means for transmitting a message to the first terminal to indicate said selected communication path;

whereby both the first terminal and the second terminal use data from respectively received RF signals which are communicated via the selected communication path.

17. For use in a digital RF communication system having a first terminal and a second terminal for communicating data therebetween, the second terminal having a plurality of antennas for communicating digital RF signals, such communication being subject to multipath interference, the first terminal comprising:

- a plurality of directional antennas for providing relatively narrow beam antenna sectors;
- receiver means, coupled to said plurality of directional antennas, for receiving a first terminal designated digital RF signal via at least one preselected one of said plurality of directional antennas; and
- transmitter means, coupled to said plurality of directional antennas, for transmitting, at a plurality of said directional antennas, a second terminal designated digital RF signal containing first terminal sector identifying information to enable the second terminal to select, from among various antenna combinations, a communication path between a first terminal sector and a second terminal sector, based at least partly on the received RF signal's integrity, so as to minimize reception errors caused by multipath interference.

18. For use in a digital RF communication system having a first terminal and a second terminal for communicating data therebetween, the second terminal having a plurality of antennas for communicating digital RF signals, such communication being subject to substantial multipath interference caused by the reception of multiple signals having differential path delays exceeding a substantial fraction of the data symbol duration, at least the second terminal, comprising:
- a plurality o directional antennas for providing relatively narrow beam antenna sectors,
- receiver means, coupled to said plurality of directional antennas, for receiving said second terminal designated digital RF signal via each of said plurality of directional antennas,
- transmitter means, coupled to said plurality of directional antennas, for transmitting a digital RF signal at a plurality of said directional antennas,
- selection means, coupled to said receiver means, for selecting, from among various antenna combinations, a communication path between a first terminal sector and a second terminal sector, based at least partly on the integrity of the second terminal designated digital RF signal, so as to overcome reception errors caused by multipath interference, and
- means for transmitting a message to the first terminal to indicate said selected communication path.

19. The terminal of claim 1, wherein the selection means includes a signal strength detection circuit for determining the signal strength of a received RF signal.

20. The terminal of claim 1, wherein a received RF signal's integrity is determined as a function of at least the received RF signal's signal strength and the amount of multipath interference in the received RF signal's communication path.

* * * * *